Patented Aug. 3, 1948

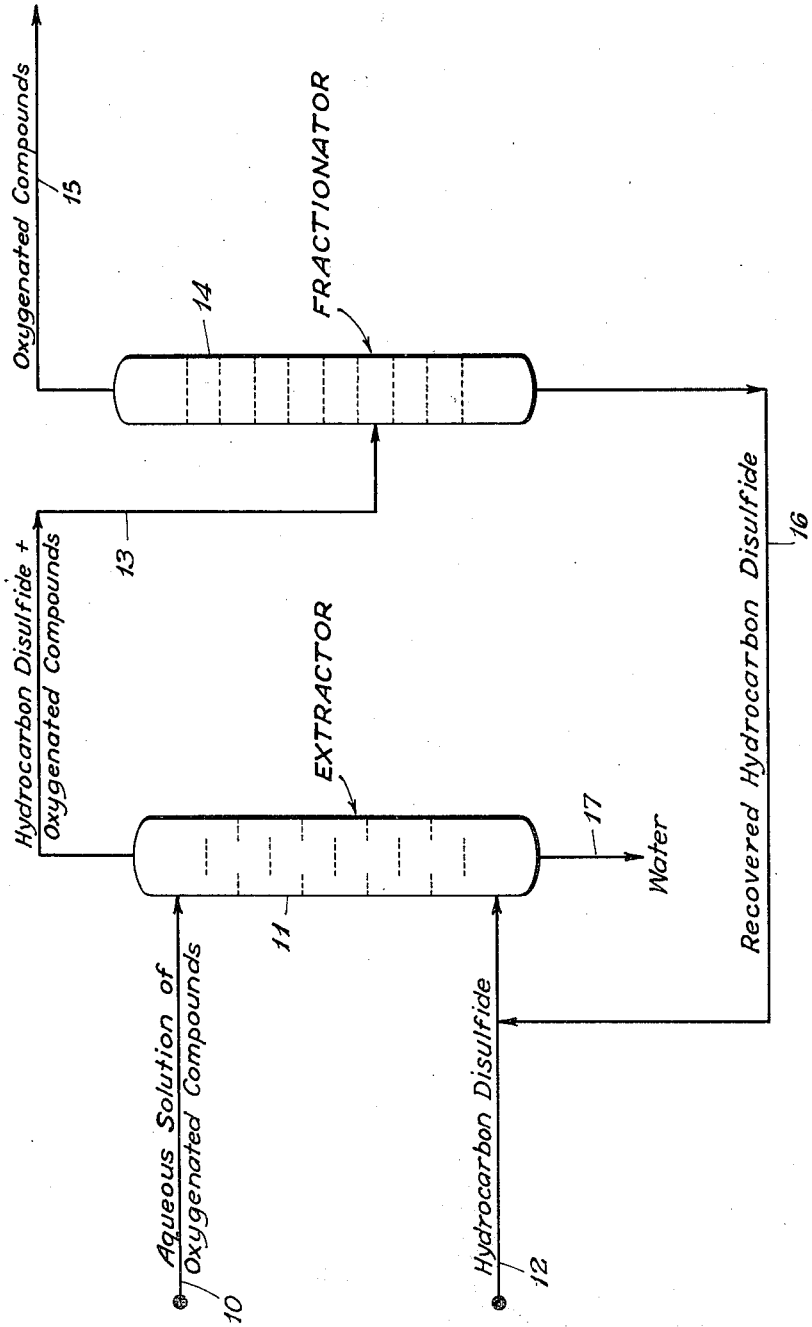

2,446,231

UNITED STATES PATENT OFFICE 2,446,231

EXTRACTION OF OXYGENATED ORGANIC COMPOUNDS FROM AQUEOUS SOLUTIONS THEREOF

Carl E. Johnson, Chicago, Ill., assignor to Standard Oil Company, Chicago, Ill., a corporation of Indiana Application December 22, 1945, Serial No. 636,939

9 Claims. (Cl. 260—450)

This invention relates to improvements in the separation of organic oxygenated compounds from dilute aqueous solutions by solvent extraction.

In many processes it is highly desirable to extract from dilute aqueous solutions organic oxygenated compounds produced as primary process products or formed as valuable by-products in the manufacture and/or synthesis of numerous products. For example, in the synthesis of hydrocarbons by conversion or reduction of carbon monoxide with hydrogen, such as the Fischer-Tropsch process, there are produced, in addition to the desired hydrocarbons, a considerable amount of oxygenated compounds, such as aldehydes, alcohols, ketones, and the like. Since such organic oxygenated compounds are of considerable value, their recovery from dilute aqueous solutions in which they are found, is highly desirable.

It is therefore an object of the present invention to provide a method of extracting organic oxygenated compounds from dilute aqueous solutions containing the same. Another object of the invention is to provide a method of recovering organic oxygenated compounds, such as alcohols, aldehydes and ketones, found in dilute aqueous solutions obtained in the synthesis of hydrocarbons by the reduction of carbon monoxide with hydrogen. Another object of the invention is to provide a method of solvent extracting organic oxygenated compounds from dilute aqueous solutions obtained in the Fischer-Tropsch synthesis. Other objects and advantages of the invention will become apparent from the following description read in conjunction with the accompanying drawing which forms a part of this specification, and which is a schematic flow diagram of one method of carrying out the herein-described invention.

I have discovered that organic oxygenated compounds, for example alcohols, aldehydes, ketones, esters and organic acids or mixtures thereof, can be recovered from dilute aqueous solutions by extracting such solutions with a hydrocarbon sulfide having the following general formula: $R_1$—S—S—$R_2$ in which $R_1$ and $R_2$ are hydrocarbon radicals, such as aliphatic, cyclic aliphatic, or aromatic radicals, for example alkyl, aryl, alkaryl and cyclic aliphatic radicals, and in which $R_1$ and $R_2$ may be the same or different hydrocarbon radicals. While I can use hydrocarbon disulfides of the type described, I prefer to use pure or mixed aliphatic disulfides having a total of 2 to about 10 carbon atoms per molecule. Examples of specific hydrocarbon disulfides which can be employed are ethyl disulfide, butyl disulfide, amyl disulfide, amyl ethyl disulfide, isoamyl disulfide, butyl hexyl disulfide, cyclohexyl disulfide, cycloheptyl disulfide, cyclopentyl disulfide, phenyl disulfide, naphthyl disulfide, tolyl disulfide, ethyl phenyl disulfide, benzyl disulfide and the like. While any of the foregoing disulfides are effective extractants for organic oxygenated compounds as herein-described, it is not to be implied that they are all equally effective, since the effectiveness of the individual hydrocarbon disulfide employed may vary with the types of oxygenated compounds extracted, their concentration and other factors.

In accordance with the present invention, the extraction of the organic oxygenated compounds from the dilute aqueous solutions containing the same can be carried out continuously as a countercurrent extraction process, or can be carried out as a single stage batch process. Likewise, depending upon the existing conditions, the extraction can be carried out as a multiple stage countercurrent batch extraction process. For maximum recovery of oxygenated compounds, the latter type process is preferred. Following the extraction of the aqueous solutions with the hydrocarbon disulfide, the extract obtained can be charged to a fractionating column operating continuously or as a batch fractionator, and the oxygenated compounds distilled from the higher boiling hydrocarbon disulfides, and the latter returned to the extraction stage. The extraction can be carried out at temperatures of from about 32° F. to about 220° F., and preferably from about 70° F. to about 110° F. and under sufficient pressure to maintain liquid phase. From about 0.1 to about 2.0 volumes of the pure or mixed disulfide can be suitably employed.

My invention will be better understood from the following description read in conjunction with the accompanying drawing. Referring to the drawing, the aqueous solution containing the oxygenated compounds, is introduced through line 10 into the upper portion of extractor 11 wherein it passes downwardly countercurrently to the hydrocarbon disulfide; for example, ethyl disulfide, introduced into the bottom portion of the extractor 11 via line 12. The extractor 11 may comprise either a bubble plate mixer, an impinging jet mixer, an agitation vessel, a plate column or a packed tower. The hydrocarbon disulfides and the oxygenated compound dissolved therein are withdrawn through line 13 to a fractionator 14, operated at a temperature suitable for distilling from the hydrocarbon disulfide the oxygenated compounds which are removed from the fractionator 14 through line 15. The bottoms of the fractionator 14, comprising substantially the hydrocarbon disulfide, are removed from the fractionator 14 through line 16 and recycled to the extractor 11 via line 12. The aqueous solution, freed of a substantial portion of the oxygenated compounds and comprising substantially water, is removed from the extractor 11 through line 17.

The effectiveness of organic disulfides in extracting oxygenated compound dilute aqueous solutions is demonstrated by the following examples which are given by way of illustration only and are not intended as limiting the scope of the invention.

*Example I.*—112 cubic centimeters of an aqueous solution, obtained in the Fischer-Tropsch synthesis of hydrocarbons, containing 6.93% oxygenated compounds, comprising essentially alcohols and aldehydes, was extracted with 25 cubic centimeters of an alkyl disulfide which was a mixture of $C_1$ and higher alkyl disulfides with an average of ethyl disulfide, at a temperature of about 75° F. A raffinate containing 3.3% of oxygenated compounds was obtained, indicating removal of 52.4% of the oxygenated compounds from the aqueous solution by extraction with the mixed alkyl disulfides.

*Example II.*—The effectiveness of organic disulfides in extracting oxygenated compounds from aqueous solutions is further demonstrated by the following data: 3 mixtures containing various percentages of various organic oxygenated compounds were made up as follows:

Mixture A: 10 cc. methyl alcohol, 25 cc. isopropyl alcohol, 25 cc. methyl ethyl ketone, 15 cc. acetone, 15 cc. ethyl alcohol, 25 cc. tert.-butyl alcohol, 20 cc. sec.-butyl alcohol, 25 cc. dioxane, 20 cc. acetic acid, and 300 cc. of water.

Mixture B: One part of mixture A, plus one part distilled water.

Mixture C: 200 cc. glacial acetic acid plus 200 cc. of water.

25 cc. of mixtures A, B, and C were extracted at 75° F. with 25 cc. of ethyl disulfide, carbon disulfide and tert.-octyl mercaptan and the following data were obtained:

| Mixture | Per Cent Oxyg. Compd. Removal from Aqueous Phase | | |
|---|---|---|---|
| | A | B | C |
| Extractant: | | | |
| Ethyl Disulfide | 42.5 | 31.9 | 12 |
| Carbon Disulfide | 26.6 | 10.6 | 0 |
| Tert.-octyl Mercaptan | 26.6 | 21.3 | 8 |

The above data show the effectiveness of the hydrocarbon disulfide in removing oxygenated compounds from aqueous solutions as compared to the effectiveness of other organic sulfur compounds.

While I have described my invention in connection with certain specific embodiments thereof, it is to be understood that the same are given by way of illustration only and are not to be taken as limiting the scope of the invention, since other modifications will be apparent to those skilled in the art and are within the scope of the appended claims.

I claim:

1. The process of separating organic oxygenated compounds from dilute aqueous solutions containing same, comprising treating said mixture under conditions to form an extract phase and a raffinate phase with a solvent consisting essentially of hydrocarbon sulfides having the general formula $R_1$—S—S—$R_2$ in which $R_1$ and $R_2$ are hydrocarbon radicals.

2. The process of removing organic oxygenated compounds from a dilute aqueous solution containing same, comprising contacting said aqueous solution with a solvent consisting essentially of a liquid hydrocarbon sulfide having the general formula $R_1$—S—S—$R_2$ in which $R_1$ and $R_2$ are hydrocarbon radicals, under conditions to produce a raffinate phase and an extract phase.

3. The process described in claim 2 in which said extract phase comprises essentially organic oxygenated compounds and the hydrocarbon sulfide and said raffinate phase comprises essentially water.

4. The process of removing oxygenated compounds from a dilute aqueous solution containing same, comprising contacting said aqueous solution with a hydrocarbon sulfide having the general formula $R_1$—S—S—$R_2$ in which $R_1$ and $R_2$ are aliphatic radicals, under conditions to form a raffinate phase comprising essentially water and an extract phase comprising essentially oxygenated organic compounds, and the hydrocarbon sulfide, and separating said raffinate phase from said extract phase.

5. The process described in claim 4 in which the aliphatic disulfides have a total of from 2 to about 10 carbon atoms per molecule.

6. The process of removing oxygenated compounds from a dilute aqueous solution containing same, comprising contacting said aqueous solution with an extractant consisting essentially of a hydrocarbon sulfide having the general formula $R_1$—S—S—$R_2$ in which $R_1$ and $R_2$ are cyclic aliphatic radicals, under conditions to form a raffinate phase comprising essentially water and an extract phase comprising essentially oxygenated organic compounds and said hydrocarbon sulfide, and separating said raffinate phase from said extract phase.

7. The process of removing oxygenated compounds from a dilute aqueous solution containing same, comprising contacting said aqueous solution with a solvent consisting essentially of a hydrocarbon sulfide having the general formula $R_1$—S—S—$R_2$ in which $R_1$ and $R_2$ are aromatic radicals, under conditions to form a raffinate phase comprising essentially water, and an extract phase comprising essentially oxygenated organic compounds and said hydrocarbon sulfide, and separating said raffinate phase from said extract phase.

8. The process of removing organic oxygenated compounds from dilute aqueous solutions containing the same, comprising extracting said aqueous solution with a solvent consisting essentially of a hydrocarbon sulfide having the general formula $R_1$—S—S—$R_2$ in which $R_1$ and $R_2$ are alkyl radicals of not more than 5 carbon atoms, under conditions to form an extract phase comprising essentially organic oxygenated compounds and said hydrocarbon sulfide, and a raffinate phase comprising essentially water, separating said raffinate phase from said extract phase, treating said extract phase to remove therefrom the organic oxygenated compounds, and recycling said hydrocarbon sulfide, substantially free of organic oxygenated compounds.

9. The process described in claim 8 in which the hydrocarbon sulfide is ethyl disulfide.

CARL E. JOHNSON.

REFERENCES CITED

The following references are of record in the file of this patent:

UNITED STATES PATENTS

| Number | Name | Date |
|---|---|---|
| 2,274,750 | Soenksen | Mar. 3, 1942 |
| 2,348,191 | Camelford | May 9, 1944 |